US008651259B1

(12) United States Patent
Blehm

(10) Patent No.: US 8,651,259 B1

(45) Date of Patent: Feb. 18, 2014

(54) LADDER BRIDGE APPARATUS

(71) Applicant: Berle G. Blehm, Oroville, CA (US)

(72) Inventor: Berle G. Blehm, Oroville, CA (US)

( * ) Notice: Subject to any disclaimer, the term of this patent is extended or adjusted under 35 U.S.C. 154(b) by 0 days.

(21) Appl. No.: 13/940,560

(22) Filed: Jul. 12, 2013

(51) Int. Cl.
*B65G 11/00* (2006.01)

(52) U.S. Cl.
USPC ........................... 193/41; 182/178.3; 182/104

(58) Field of Classification Search
USPC .............. 193/2 A, 41; 182/230, 178.3, 178.5, 182/104, 105
See application file for complete search history.

(56) References Cited

U.S. PATENT DOCUMENTS 3,970,170 A * 7/1976 Darling ......................... 182/230
4,060,150 A * 11/1977 Hughes ......................... 182/151
4,086,980 A * 5/1978 Shortes et al. ................ 182/151
4,907,675 A * 3/1990 Saby et al. ................. 182/178.5
5,323,573 A * 6/1994 Bakewell, III .................... 52/86
5,901,810 A * 5/1999 Krause ....................... 182/178.5
8,468,652 B2 * 6/2013 Salice ............................... 16/82
2006/0278473 A1 * 12/2006 Spinelli ......................... 182/196
2008/0302630 A1 * 12/2008 Yang ............................... 193/41
2010/0154351 A1 * 6/2010 Messenburg ............... 52/745.17

* cited by examiner

*Primary Examiner* — James R Bidwell

(74) *Attorney, Agent, or Firm* — William Bodnar

(57) ABSTRACT

A ladder bridge apparatus for use in connecting two ladder sections is disclosed herein. The ladder bridge apparatus, in its simplest form, includes an adjustable center stabilizer bar connecting outer rail bridge assemblies. The rail bridge assemblies are directly connected to the adjacent ladder sections. The ladder bridge apparatus can be utilized in conjunction with a material transport device to transport materials over the rails of a first ladder section and onto and across the ladder bridge apparatus to a second ladder section.

11 Claims, 6 Drawing Sheets

LADDER BRIDGE APPARATUS

CROSS-REFERENCE TO RELATED APPLICATIONS

None.

FIELD OF THE INVENTION

Embodiments of the present invention present an apparatus for attaching sections of ladders together to provide a mechanism for transporting materials up a first ladder section (in one application) over and past the apparatus and onto a second ladder section. In its broadest scope, this apparatus can connect two sections of ladder and provide a pathway for materials transported thereon between the two ladder sections.

BACKGROUND OF THE INVENTION

The present invention relates generally to hoisting systems that can travel over the rails of a ladder and, more particularly, to a ladder bridge apparatus for connecting two ladder sections. In a typical application, one ladder section will be set up on the ground surface and the other ladder section will be positioned on the roof of a building. The connection device can be utilized to provide a bridge between the two ladder sections to transport material, for example, over the roof eave to the roof surface.

Extreme difficulty is often encountered in lifting heavy objects to the top of a house, up and over the roof eave to the roof. This can be accomplished with a crane, but the expense of using a crane is often prohibitive. In addition, it would be difficult and expensive to transport a large piece of equipment such as a crane to a job site. Often there are cramped quarters around the jobsite and there is simply not enough room for large equipment.

Other portable equipment may be utilized but often cause damage to the roof gutters. To overcome these obstacles, the ladder bridge apparatus may be used in conjunction with a transport mechanism to lift materials from the ground to the roof eave and beyond or to transport materials from point A to point B.

A typical transport mechanism that this ladder bridge apparatus can be used in conjunction with is generally described in. U.S. Pat. No. 8,002,512 issued to Blehm in 2011. Other transport mechanisms could be utilized with the ladder bridge apparatus and the scope of the material transport mechanism is not specified herein.

There is a need for an apparatus that can be easily attached to a multi-section ladder and used to move materials from point A to point B. In particular there is a need for an apparatus that can be attached to ladder sections to lift loads over the eave of a roof of a building without damaging the gutters. The portability of such an apparatus is important so that it can be transported by one person to and from a jobsite easily and can also be affixed to and removed from a ladder by a worker with a minimum of effort.

SUMMARY OF THE INVENTION

In accordance with one embodiment of this invention, an apparatus for attaching two ladder sections is disclosed. This apparatus, called a ladder bridge or ladder connection apparatus, is utilized to connect two ladder sections having the same or different ladder widths. The ladder bridge apparatus provides a pathway for a material transport device that typically utilizes the rails of the ladder sections as track for the material transport to travel upon.

The ladder bridge apparatus, in its simplest form, includes an adjustable center stabilizer bar connecting outer rail bridge assemblies. The rail bridge assemblies are directly connected to the adjacent ladder sections.

It is an object of an embodiment of the invention to provide a ladder bridge/connection apparatus which may be easily transported. It is still another object to provide a ladder bridge apparatus which may be used to lift loads up to and over a roof eave onto the roof. Another object is to provide an apparatus that can be utilized to connect two sections of ladder that have the same ladder width or vary in ladder width.

Embodiments of the present invention can also be utilized to move a material load from the eave section of the roof to the peak of the roof without damaging the roof structure. At least one of the stated objects will be satisfied by embodiments of the present invention.

The foregoing and other objects, features and advantages of this invention will be apparent from the following description of the preferred embodiments of the invention, as illustrated in the accompanying drawings.

BRIEF DESCRIPTION OF DRAWINGS

The character of the embodiments of the invention may be best understood by reference to the structural form, as illustrated by the accompanying drawings.

DETAILED DESCRIPTION OF THE PREFERRED EMBODIMENTS

Figure 1:
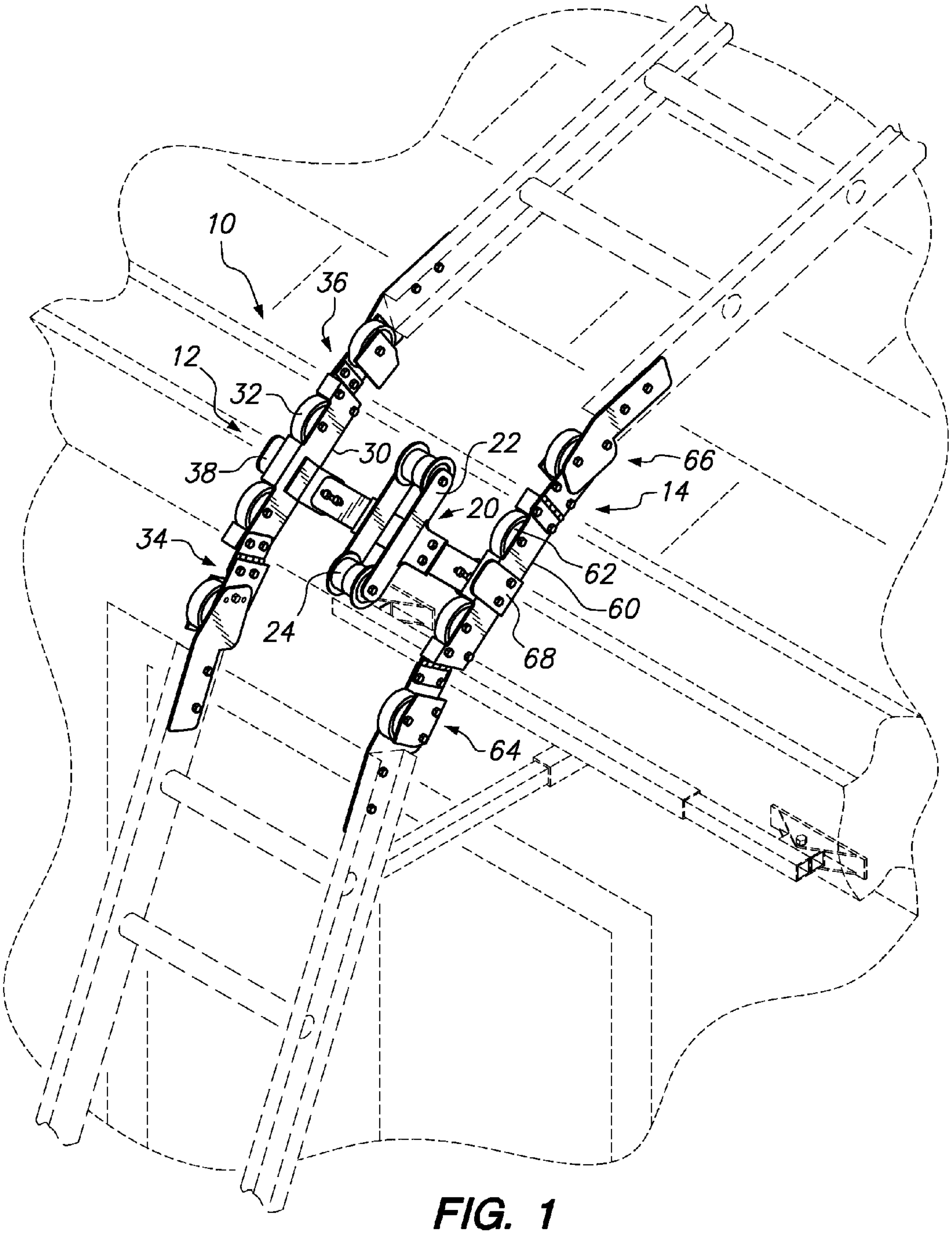
FIG. 1 illustrates a perspective view of the ladder bridge apparatus attached to two ladder sections and in place over the eave of a roof.

Referring to FIGS. 1-5, which show the general features of a preferred embodiment of the invention, the ladder bridge apparatus 10 contains an adjustable center stabilizer section/bar 20 connecting two outer rail assemblies 12, 14. The center stabilizer bar 20 is adjustable to set the outer rail assemblies to the appropriate width for the ladder(s) attached thereto. Attached to the center stabilizer bar is a pulley component 22 which contains at least one pulley roller or wheel 24 for accommodating a pulley cable utilized therewith. The ladder bridge 10 is shown in position connecting two ladder sections in FIG. 1.

The outer rail assemblies 12, 14 each contain at least one wheel or roller component 32, 62 to accommodate movement of a material transport device thereupon. The outer rail assemblies have rail mounting sections 34, 36, 64, 66 for attachment to adjacent ladder rails. These rail mounting sections are adjustable in two directions (about two axes of rotation). The outer rail assemblies 12, 14 also have guide components 38, 68 which are utilized to keep the material transport in position when traveling from one ladder section to the other via the ladder bridge.

Figure 2A:
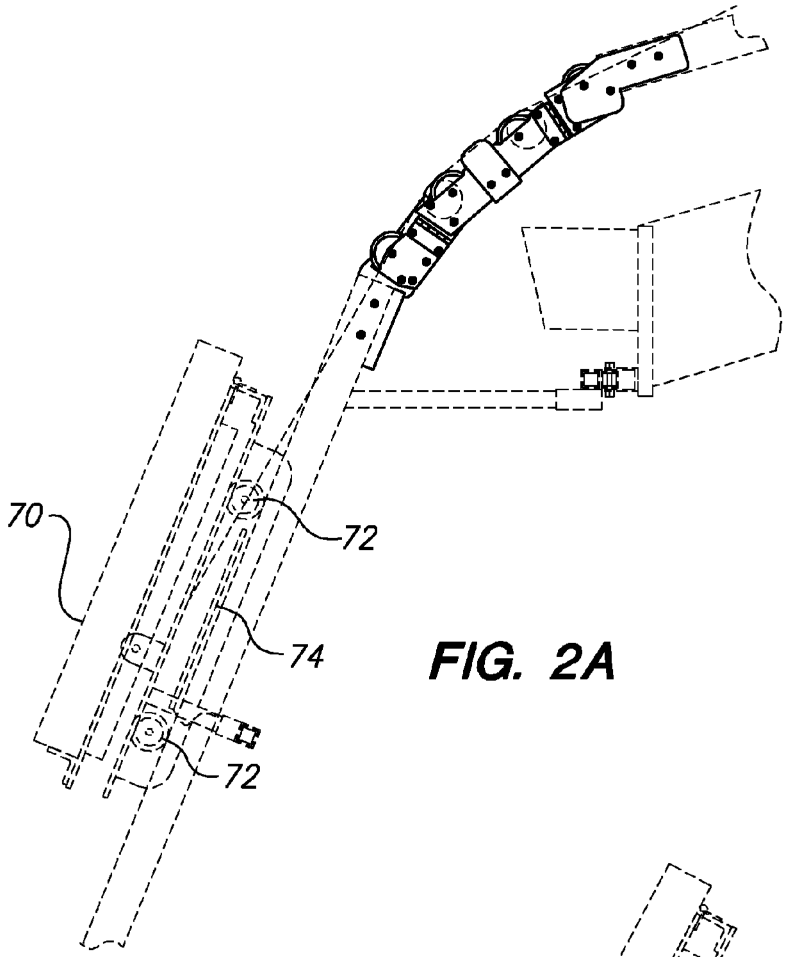
FIGS. 2A-D present a side view of ladder bridge apparatus attached to two ladder sections and in place over the eave of a roof showing a material transport being pulled up a ladder and over the ladder bridge apparatus.

FIG. 2A presents a side view of a material transport 70 being hoisted up the lower (or first) ladder section. The material transport travels up the lower ladder by rolling via wheels 72 along the ladder rails. The ladder rails provide a "track" for the material transport wheels. The material transport has rails 74 on each side of the transport mechanism. As shown in FIG. 2A, the material transport rails 74 do not touch the ladder rails while the material transport is traveling along the ladder.

Figure 2B:
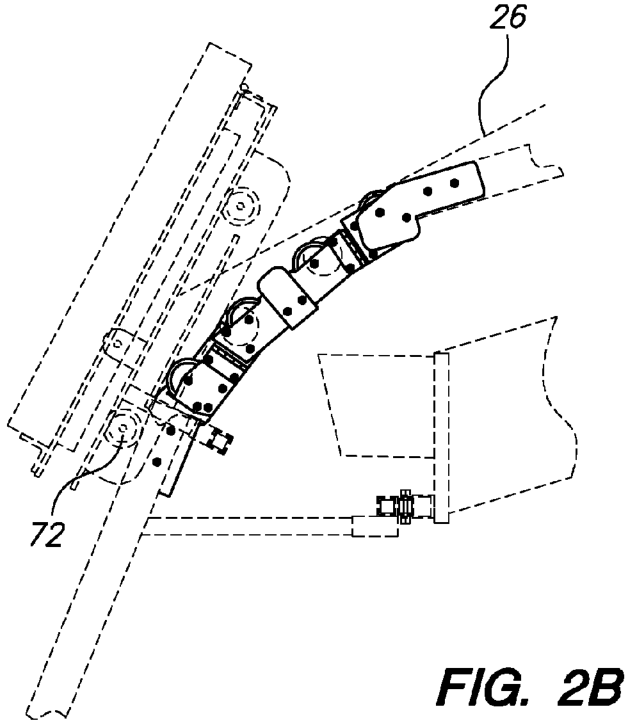

In FIG. 2B the material transport is being pulled by a pulley cable 26 and is transitioning from the ladder to the nearest sections of the ladder bridge device. The rear wheels 72 of the material transport are in contact with the ladder rails and the material transport rails are in contact with the wheels of the ladder bridge apparatus.

Figure 2C:
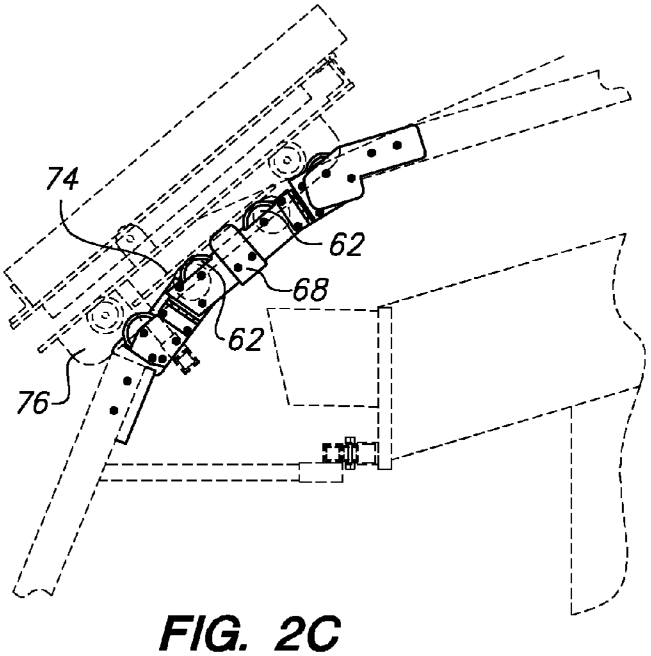
Figure 2D:
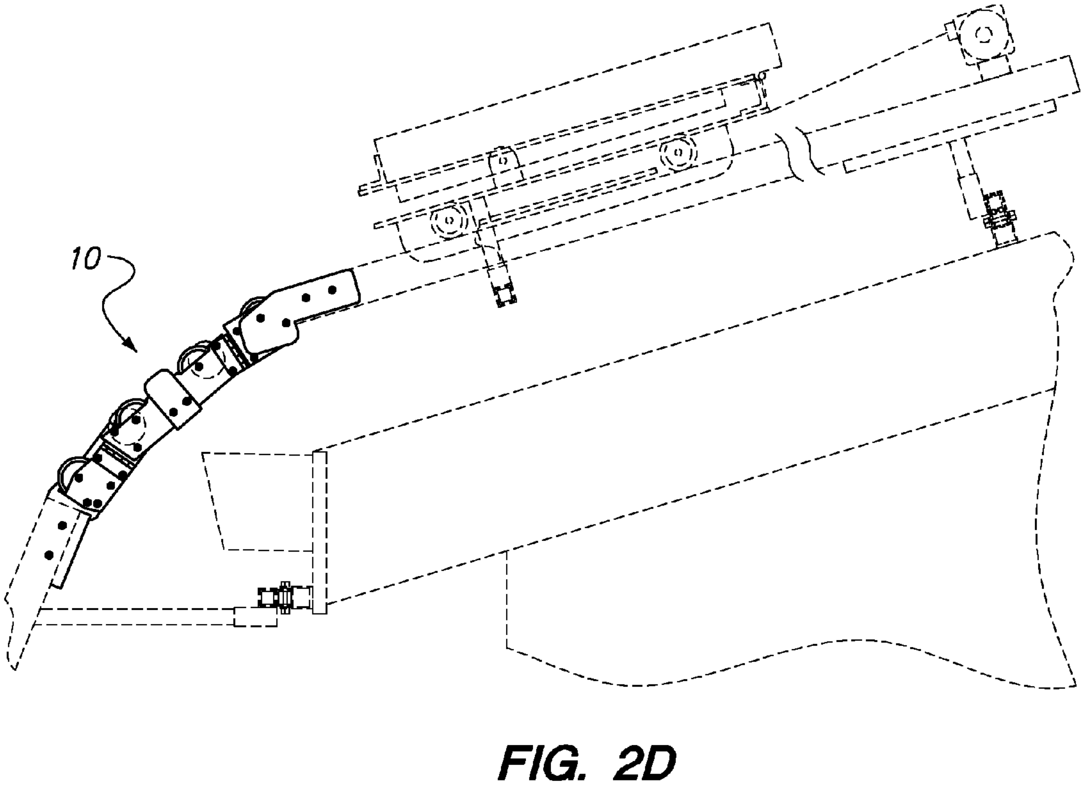

The material transport has been hoisted further as seen in FIG. 2C to where the contact points are between the material transport rails 74 and the wheels 62 of the ladder bridge rail assemblies. The material transport is traveling along the wheels of the ladder bridge device. The sides 76 of the material transport are kept are kept in place by the ladder bridge guides 68 as the material transport traverses the ladder bridge. The material transport has passed the ladder bridge device 10 in FIG. 2D and is shown on the upper (or second) ladder section.

Figure 3:
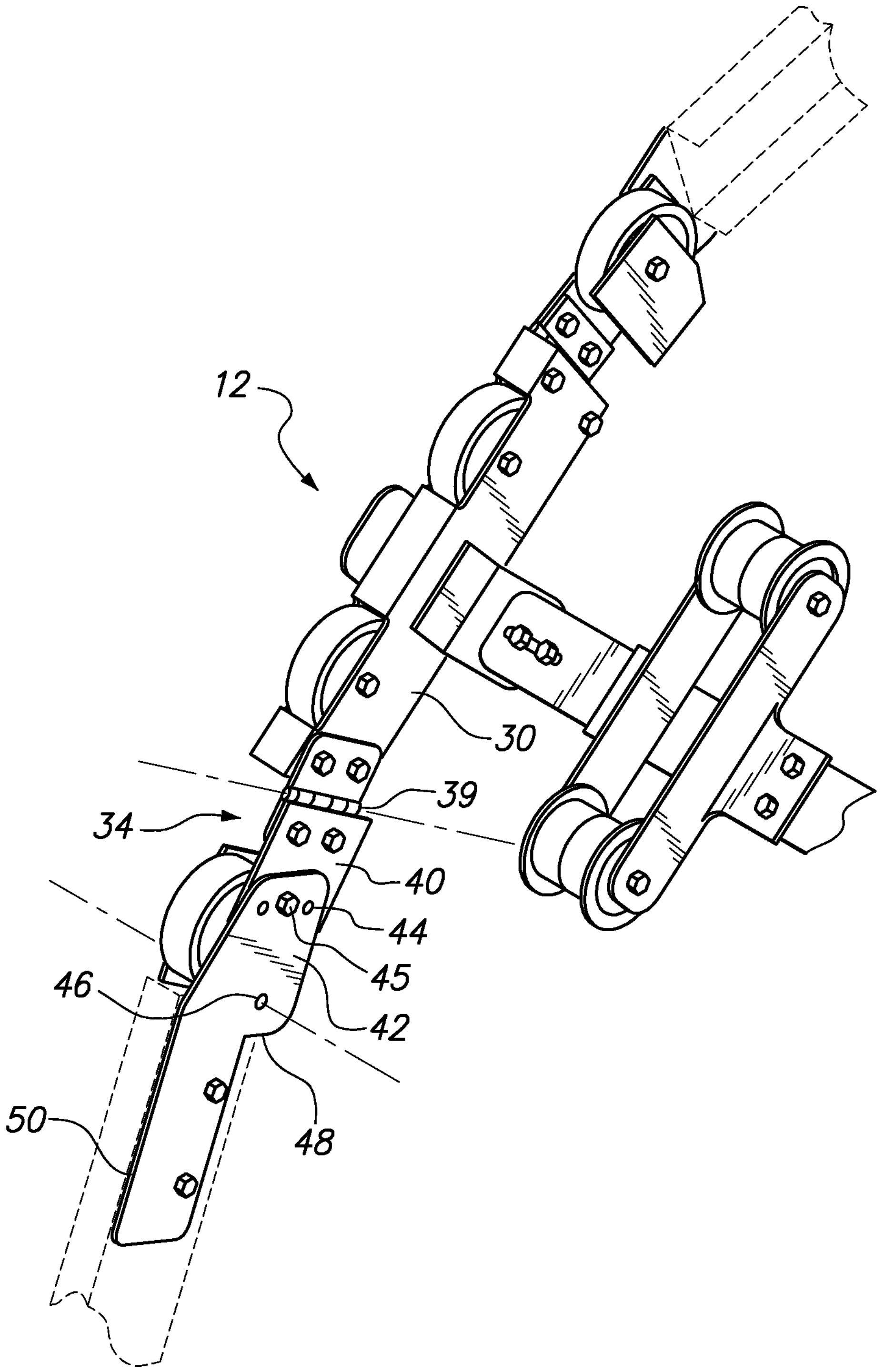
FIG. 3 shows a perspective close-up view of components of the ladder bridge apparatus.

A close-up view of the left ladder bridge assembly 12 is shown in FIG. 3. The rail mounting section 34 utilizes a hinge 39 to accommodate for varying widths of ladder sections connected thereto. One hinge flange is connected to the left center plate 30 and a second hinge flange is connected to a hinge plate/bracket 40 which is adjustably connected to the mounting plate 42.

The angle between the ladder bridge apparatus 10 and the ladder can be adjusted via the positioning holes 44 on the ladder mounting plate 42. A connection component 46 (typically a bolt) acts as a pivot point for the adjustment. A securing component 45 (typically a bolt) secures the ladder in position. Thus the ladder bridge device is adjustable about at least two axes of rotation.

The ladder mounting plate 42 is typically connected to a ladder section on the side of the ladder opposite the ladder flange as shown in FIG. 3. Installation of the ladder mounting plate can be accomplished by first positioning the mounting plate on the side of the ladder containing the ladder flange. The first positioning edge 48 of the mounting plate can be aligned with the top edge of the ladder and the second positioning edge 50 of the mounting plate can be positioned inside the ladder flange against the outer arm of the flange (not shown). Holes can then be drilled in the ladder for proper alignment. Thus the ladder mounting plate will contain predrilled mounting and positioning holes 44, 46 to secure the plate to the ladder by moving the plate to the non-flange side of the ladder and mounting in position as shown in FIG. 3.

The mounting plate can be secured to the ladder inside the ladder flange if required. Typically the determination of positioning the mounting plate on the inside or outside of the flange will be determined by the ladder rail width. The center of the first wheel of the ladder bridge is ideally aligned approximately with the center of the ladder rail. Therefore one could position the mounting plate on the inside or outside of the flange to best align the first wheel substantially with the center of the ladder rail.

Figure 4:
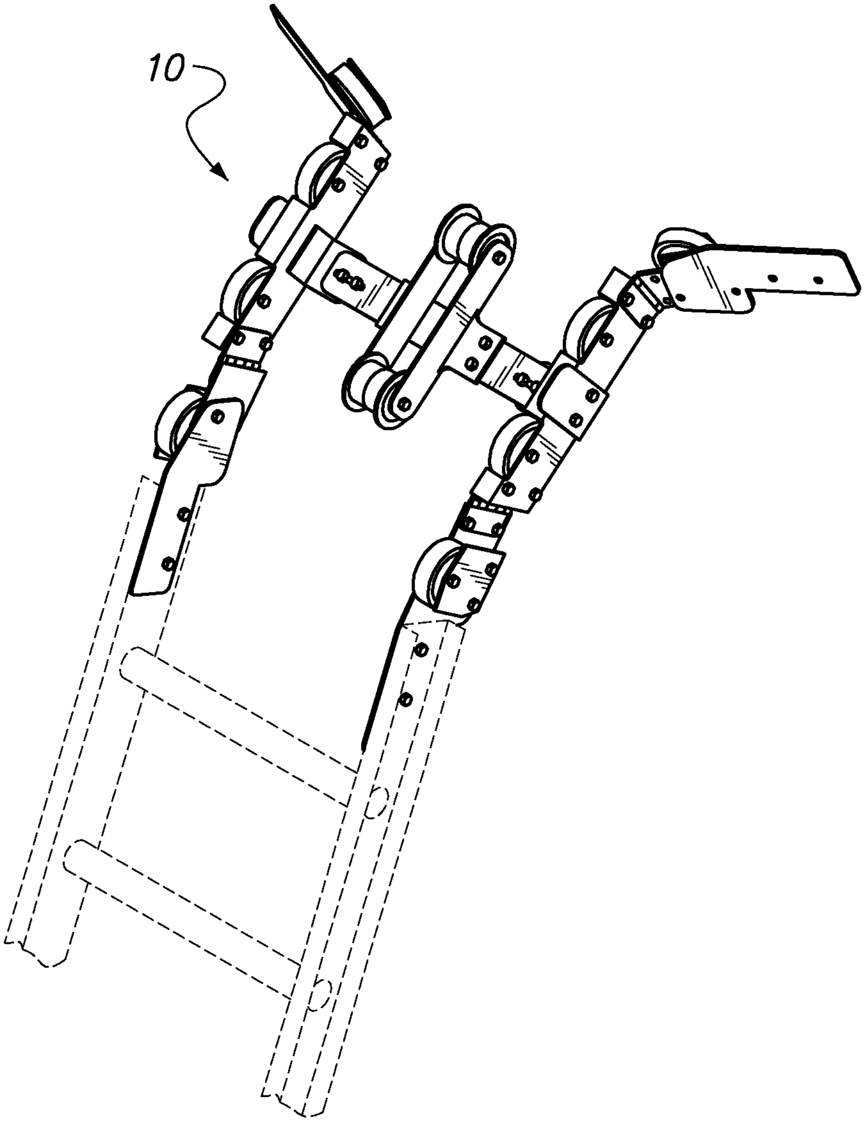
FIG. 4 shows the ladder bridge apparatus attached to one section of a ladder. The opposite end of the ladder bridge apparatus is unattached showing the hinged adjustments for connecting to ladder sections of varying widths.
Figure 5:
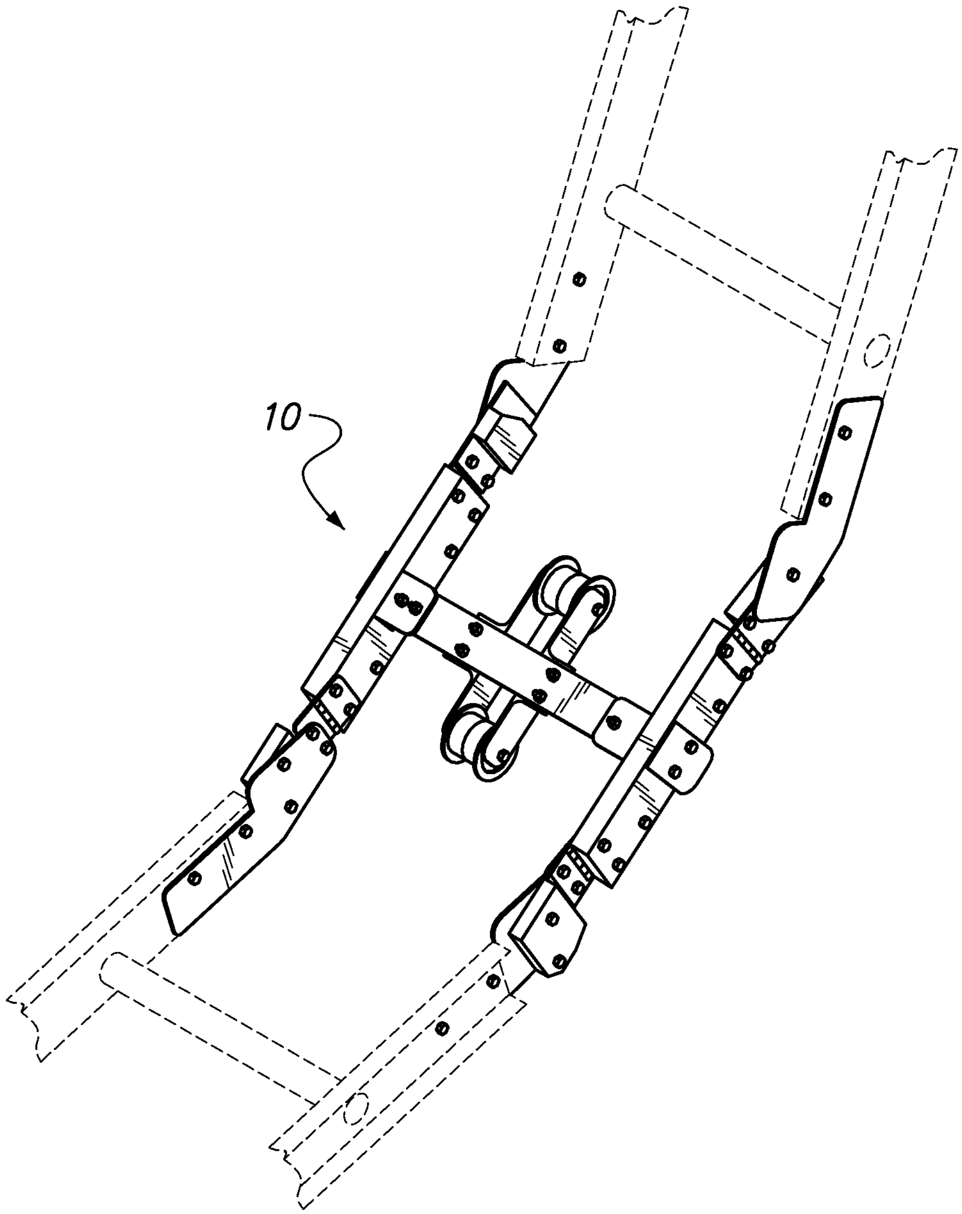
FIG. 5 shows the underside of the ladder bridge apparatus.

FIG. 4 shows the ladder bridge 10 connected to a single ladder section. The hinge capacity of the hinge plate and mounting plate is clearly illustrated. A bottom view of the ladder bridge 10 is shown in FIG. 5.

CONCLUSIONS, OTHER EMBODIMENTS, AND SCOPE OF INVENTION

The ladder bridge apparatus disclosed herein presents a novel device that can be utilized to connect two ladder sections to transport materials across. Typically the first ladder section will be located at a lower position than the second ladder section as illustrated in moving materials to the roof of a building. The ladder bridge apparatus can also be utilized to transport materials from point A to point B regardless of any discrepancy in height of the two ladder sections.

The ladder bridge apparatus can be used in conjunction with any suitable material transport device to move material across ladder sections from a first position to a second position. If more than two sections of ladders are needed to be connected in series, more than one ladder bridge apparatus can be used. In this scenario each ladder bridge apparatus will connect two adjacent ladder sections.

Other examples of the invention will be apparent to those skilled in the art from a consideration of the specification or practice of the invention disclosed herein. It should be evident that this disclosure is by way of example and that various changes may be made by adding, modifying, or eliminating details without departing from the fair scope of the teaching contained in this disclosure. The invention is therefore not limited to particular details of this disclosure except to the extent that the following claims are necessarily so limited. Thus it is intended that the specification and examples be considered as illustrative only, with the true scope and spirit of the invention being indicated by the following claims.

What is claimed is:

1. A ladder bridging apparatus comprising:

a left rail bridge assembly for connecting the left rails of two ladders together and a right rail bridge assembly for connecting the right rails of the two ladders together; and a center stabilization bar affixed at a first end to the left rail bridge assembly and at a second end to the right rail bridge assembly, the stabilization bar adjustable for establishing the spacing between and the alignment of the left and right rail bridge assemblies.

2. The ladder bridging apparatus of claim 1 further including:

at least one roller mounted to the left rail bridge assembly and at least one roller mounted to the right rail bridge assembly, the rollers adapted to support passage of a material transport vehicle over the ladder bridging apparatus.

3. The ladder bridging apparatus of claim 2 wherein the center stabilization bar includes at least one pulley wheel mounted with the direction of rotation of the wheel substantially orthogonal to the longitudinal axis of the bar, the at least one pulley wheel for seating a pulley wire attached to a material transport mechanism.

4. The ladder bridging apparatus of claim 2 wherein the left and right rail bridge assemblies each include an elongate center plate flanked by opposing rail mounting sections, the mounting sections each comprising a mounting plate attached to a hinge plate.

5. The ladder bridging apparatus of claim 4 wherein the mounting plates are each angularly adjustable relative to the hinge plates, the direction of adjustment in line with the ladder rails to achieve a desired angle with respect to the bridged ladders.

6. The ladder bridging apparatus of claim 2 wherein the rail mounting sections disposed at like ends of both the left and right rail bridge assemblies are mirror images of one another.

7. The ladder bridging apparatus of claim 5 wherein the mechanism of angular adjustment includes a point of rotation shared between the mounting plate and hinge plate, an arcuate slot or an arcuate hole pattern formed in the mounting plate and communicable through the hinge plate, the slot or hole pattern formed along a radius drawn from the point of rotation in the mounting plate wherein one or more fasteners are employed to tighten the mounting plate against the hinge plate at the desired angle.

8. The ladder bridging apparatus of claim 2 wherein the overall width dimension of the bridged ladders is not the same for both ladders.

9. The ladder bridging apparatus of claim 2 wherein the hinges characterizing the hinge plates are rotatable about substantially vertical axes, the hinge mechanisms exhibiting an amount of play between the hinge pin and housing, the play sufficient for compensation for bridged ladders having different overall width dimensions.

10. The ladder bridging apparatus of claim 2 wherein there are at least two rollers mounted on each rail bridge assembly, the rollers arrayed linearly sharing a centerline or linearly but somewhat staggered.

11. The bridging apparatus of claim 4 wherein the mounting plates comprise at least one positioning edge for alignment with a ladder section attachable thereto.

* * * * *